Jan. 5, 1965  J. A. SPICER ETAL  3,164,047
METHOD OF CUTTING FILAMENT TOW AND CONVEYING THE SLIVERS AWAY
Filed Nov. 15, 1961  2 Sheets-Sheet 1

Inventors
Jack Albert Spicer
Harold Oatridge Farmer
By their attorneys
Howson and Howson

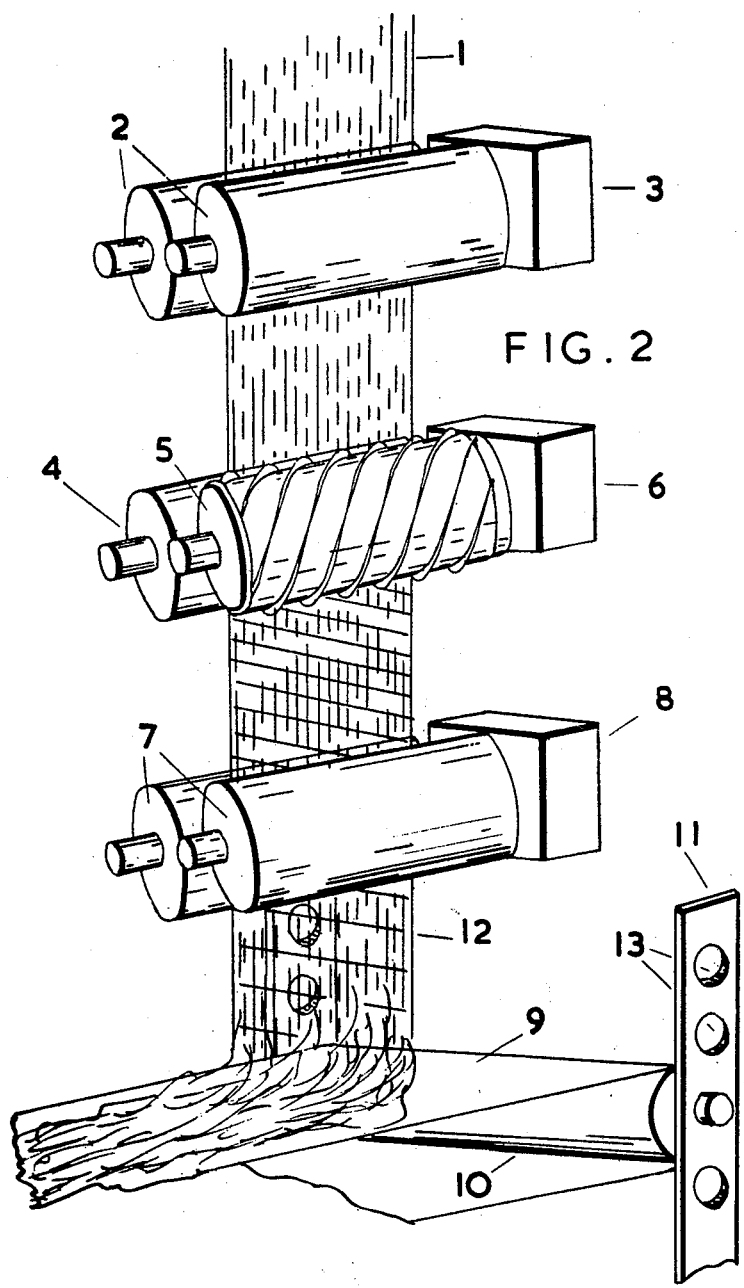

United States Patent Office

3,164,047
Patented Jan. 5, 1965

3,164,047
METHOD OF CUTTING FILAMENT TOW AND CONVEYING THE SLIVERS AWAY
Jack Albert Spicer, Coventry, and Harold Oatridge Farmer, Rugby, England, assignors to Courtaulds Limited, London, England, a British company
Filed Nov. 15, 1961, Ser. No. 152,570
Claims priority, application Great Britain, Nov. 15, 1960, 39,146/60; Dec. 15, 1960, 43,159/60
8 Claims. (Cl. 83—23)

This invention relates to the method of cutting filament tow and conveying the slivers away and in particular to producing a coherent continuous top of staple fibre hereinafterwards referred to as a sliver. British patent specification No. 511,867 describes an apparatus for cutting tows of continuous filaments to form a sliver. The continuous filamentary tow is fed through a nip formed by two rollers of which one, hereinafter referred to as the helical cutter, has helical cutting ridges protruding from its cylindrical surface and the other, hereinafter referred to as anvil roller, has a smooth cylindrical surface. Such a combination of a helical cutter and an anvil roller is hereinafter referred to as a cutting roller set.

The length of the staple fibre produced by this apparatus is equal to the distance (measured around the circumference of the outwardly directed tips of the ridges) between adjacent ridges of the helical cutter. Previously if it was necessary to alter the length of staple fibre produced it has been thought necessary to replace the helical cutter with a helical cutter having the desired dimensions. This is not only a time consuming operation but it necessitates a range of helical cutters of different dimensions being made.

The staple fibre on leaving the cutting rollers is in the form of a sliver which has to be conveyed to the next processing step, for example a gilling or carding operation. Previously as shown for example in British patent specification No. 523,579, the tow has been passed horizontally through the cutting rollers and the resulting sliver guided on to a conveyor belt by a funnel-like device. This method of conveying the sliver is not entirely satisfactory since the fibre arrangement in the sliver tends to become irregular due to the side walls of the funnel-like device having a restricting effect and causing some disarrangement of the fibres.

This invention seeks to provide an apparatus and method which improves on the previously described apparatus and method for altering the length of the staple fibre and which improves the quality of the sliver produced.

According to this invention an apparatus for converting tows to slivers of staple fibres and for collecting the resultant slivers comprises a cutting roller set and at least one set of controlling rollers, the speed of at least one of these sets being adjustable and a conveyor belt which runs in the general direction of the longitudinal axes of the cutting roller set and which is positioned below the last set of rollers for receiving slivers delivered therefrom.

Also according to this invention a method for converting tows to slivers of staple fibres comprising the steps of passing a tow through at least one set of controlling rollers and a cutting roller set, and feeding the sliver from the last set of rollers downwards on to a conveyor belt which runs in the general direction of the longitudinal axes of the cutting roller set.

The controlling rollers may include output nip rollers as well as input nip rollers, which preferably are run respectively at a higher and lower speed than the cutting rollers.

The length of staple fibre produced may be changed by altering the length of tow passed through the cutting rollers per revolution of the helical cutter. This may be done by altering the speed of some or all of the controlling rollers or of the cutting roller set. Thus if the speed of the input rollers is increased, more tow is passed to the cutting rollers per revolution of the helical cutter and a longer staple fibre is produced.

Alternatively the speed of the controlling rollers may remain unaltered and the speed of the cutting roller set may be increased or decreased.

We have found that the provision of output nip rollers helps to improve the quality of the sliver produced since the cut of the tow is cleaner and the sliver produced contains fewer neps and imperfections. The output nip rollers appear to hold the fibres under tension while they are being cut. We have found that this beneficial tensioning of the fibres while they are being cut occurs not only when the distance between the nips of the output nip rollers and the cutting rollers is less than the length of staple fibre being produced which causes the individual filaments to be held at both ends while being cut, but also if this distance is somewhat greater.

The sliver produced by the cutting operation is eventually spun into a yarn. In order to form a yarn of maximum strength, the fibres in the sliver from which the yarn is formed must be substantially parallel and the ends of the cut fibres must be randomly distributed along the length of the sliver. However, when a tow is cut by a cutting roller set the ends of the cut fibres are aligned across the resulting sliver. The purpose of the gilling and carding operations is to randomise the distribution of the ends of the cut fibres in the sliver.

We have found that by feeding sliver from the cutting roller set or the output nip rollers downwards on to a conveyor belt which runs in the general direction of the longitudinal axes of the cutting roller set we can increase the random distribution of the ends of the cut fibres and thus reduce the necessity for the gilling and carding operations. This method of feeding causes the fibres to be fed on top of one another and so overlapping of the ends of the cut fibres is achieved in the vertical plane. The vertical feeding of the sliver on to a conveyor belt also avoids passing the sliver through the constricting side walls of a funnel and therefore avoids disarrangement of the fibres.

When we state that the conveyor belt runs more or less in the general direction of the longitudinal axes of the cutting roller set we means that it is not necessary for the conveyor belt to run parallel to these axes but that it may run at a small angle to them. Of course the greatest overlap of the fibre ends in the vertical plane is achieved when the conveyor belt is running parallel to these axes and no overlap is achieved when the conveyor belt runs at right angles to this axis.

The conveyor belt is preferably run not horizontally but at a slight angle to the horizontal since we have found this to improve quality of the sliver.

The conveyor belt is preferably run at the same speed as the sliver. If the conveyor belt is run at a slower speed than the sliver speed, a thicker sliver is formed on the conveyor belt. If the conveyor belt speed is faster than the sliver speed, the thickness of the sliver on the conveyor belt is decreased, but the reguarlity of the fibres in the sliver may be improved.

The accompanying drawings illustrate two examples of the apparatus according to this invention.

FIGURE 2 shows an example in which input and output controlling rollers are provided.

Figure 1:
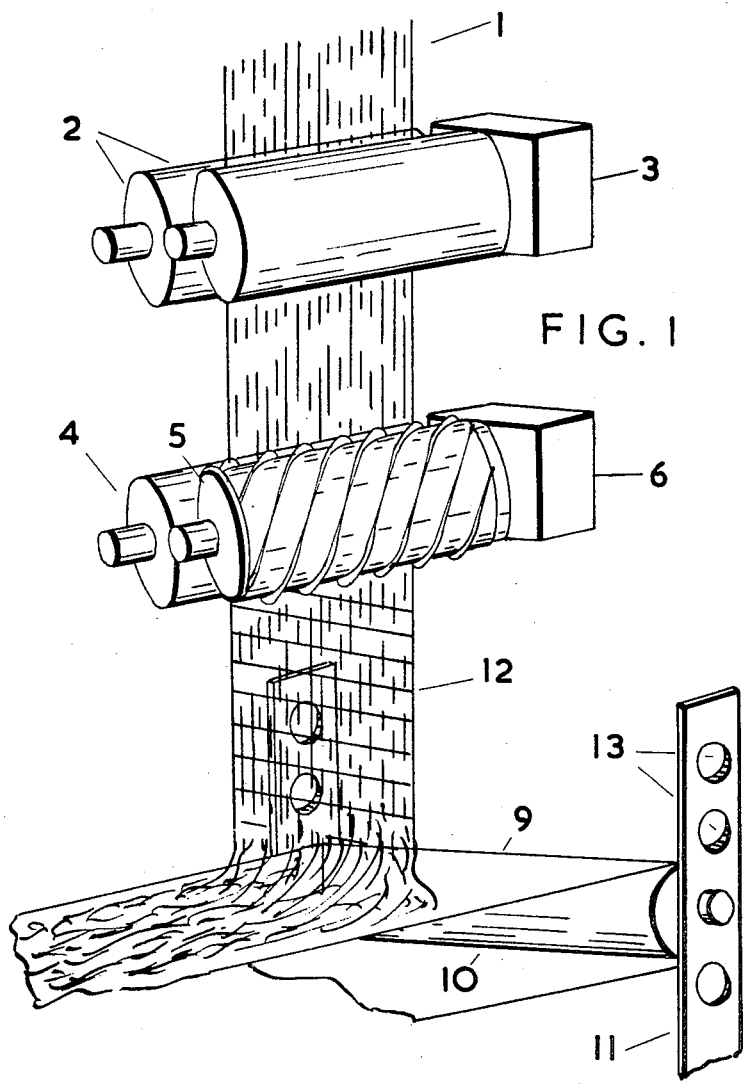
FIGURE 1 shows an example in which only input controlling rollers are provided.

Referring to FIGURE 1 a tow 1 is passed through input nip rollers 2 to a cutting roller set comprising a helical cutter 5 and an anvil roller 4. The speed of the input roller set 2 and the cutting roller set being adjustable by means of variable speed driving mechanisms 3 and 6 respectively. The resulting sliver 12 is fed to a conveyor belt 9 which runs parallel to the longitudinal axes of the helical cutter 5 and anvil roller 4. One end of the conveyor belt 9 runs round a roller 10. The conveyor belt 9 runs at a slight angle to the horizontal. The angle at which it runs being adjustable by altering the height of the roller 10 relative to the other end of the conveyor belt (not shown) by means of an holder 11 provided with a series of holes 13.

In FIGURE 2 similar portions of the apparatus as in FIGURE 1 are designated by the same numerals.

The tow 1 is passed through the input nip rollers 2 through the cutting roller set 4 and 5, the resulting sliver 12 being passed through the output nip rollers 7 whose speed is alterable by means of a variable speed driving mechanism 8 and the sliver 12 is fed on to the conveyor belt 9.

What we claim is:

1. A method for converting continuous filament tows to slivers of staple fibres comprising feeding a substantially flat band of tow of continuous filaments, cutting the fed tow at uniformly spaced intervals, to produce a coherent continuous band of cut tow and feeding the band of cut tow downwardly continuously collecting the downwardly fed cut tow as a sliver and conveying the sliver in the general direction parallel to the plane of the band of cut tow and transverse to its direction of travel.

2. A method as claimed in claim 1 in which the band of tow is fed vertically downwards.

3. Apparatus for converting continuous filaments tows to slivers of staple fibres comprising the combination of means for feeding a substantially flat band of tow of continuous filaments, means for cutting the fed tow at uniformly spaced intervals, to produce a coherent continuous band of cut tow and delivering the band of cut tow downwardly, and means positioned directly below the said cutting means, for continuously collecting the cut tow as a sliver and conveying the sliver in the general direction parallel to the plane of the band of cut tow and transverse to its direction of travel, and means for varying the speed of the feeding means relative to the cutting means, whereby changes are made in the lengths of cut staple fibres produced.

4. An apparatus as claimed in claim 3 in which all the means are in substantially vertical alignment.

5. Apparatus for converting continuous filament tows to slivers of staple fibres and for collecting the resultant slivers comprising a cutting roller set and at least one set of controlling rollers preceding the cutting roller set, the speed of at least one of these sets being adjustable and a conveyor belt which runs in the general direction of the longitudinal axes of the cutting roller set and which is positioned below the last set of rollers for receiving slivers delivered therefrom.

6. An apparatus as claimed in claim 5 in which the controlling rollers include a set of output nip rollers.

7. An apparatus as claimed in claim 5 in which the conveyor belt is inclined at an angle to the horizontal when in the normal position of use.

8. An apparatus as claimed in claim 5 in which the set of controlling rollers and the cutting roller set are positioned one above the other and over said conveyor belt in a vertical plane.

References Cited by the Examiner
UNITED STATES PATENTS

| | | | |
|---|---|---|---|
| 822,765 | 6/06 | Perkins | 83—155 |
| 1,533,126 | 4/25 | Martin | 83—155 |
| 2,598,086 | 5/52 | Von Kohorn | 83—913 |
| 2,808,884 | 10/57 | Shann | 83—913 |
| 3,013,313 | 12/61 | Catling | 19—155 |

ANDREW R. JUHASZ, *Primary Examiner.*

CARL W. TOMLIN, *Examiner.*

UNITED STATES PATENT OFFICE
CERTIFICATE OF CORRECTION

Patent No. 3,164,047            January 5, 1965

Jack Albert Spicer et al.

It is hereby certified that error appears in the above numbered patent requiring correction and that the said Letters Patent should read as corrected below.

Column 2, line 46, for "means" read -- mean --; column 4, line 25, after "belt" insert -- in a vertical plane. --; line 36, strike out "in a vertical plane.".

Signed and sealed this 6th day of July 1965.

(SEAL)
Attest:

ERNEST W. SWIDER
Attesting Officer

EDWARD J. BRENNER
Commissioner of Patents